United States Patent [19]

Tamamura et al.

[11] 4,049,069

[45] Sept. 20, 1977

[54] DEVICE FOR WEIGHING RUNNING VEHICLE

[75] Inventors: Ryozo Tamamura, Osaka; Masami Yamanaka, Miki, both of Japan

[73] Assignee: Yamato Scale Company, Limited, Japan

[21] Appl. No.: 683,048

[22] Filed: May 5, 1976

[30] Foreign Application Priority Data

Aug. 26, 1975 Japan .................. 50-103861

[51] Int. Cl.² .......................................... G01G 19/02
[52] U.S. Cl. .................. 177/134; 177/DIG. 8
[58] Field of Search ............. 177/132, 133, 134, 136, 177/163, 210 R, DIG. 8

[56] References Cited

U.S. PATENT DOCUMENTS 3,276,525 10/1966 Cass ....................................... 177/163
3,835,945 9/1974 Yamanaka ............................ 177/134

Primary Examiner—Joseph W. Hartary
Attorney, Agent, or Firm—Eugene E. Geoffrey, Jr.

[57] ABSTRACT

Apparatus for measuring the weight of a moving vehicle which includes a series of platforms with the length of each platform being shorter than the distance between axles, means for converting displacement of said platforms to electrical signals and electronic means for averaging the signals produced by the individual axle loads to produce the weight of the vehicle.

3 Claims, 7 Drawing Figures

DEVICE FOR WEIGHING RUNNING VEHICLE

This invention relates to an improvement in a device for weighing a moving vehicle and more particularly to a device for measuring an "axle load" or "wheel load" of a moving vehicle. Here, the term "axle load" means the load on each wheel axle, that is, on each pair of wheels and the term "wheel load" means the load on each wheel.

Measuring devices for this purpose, which have been put in practical use, are roughly divided into two man classes, that is, one arranged to read the maximum value of the load applied to a weighing platform when a vehicle passes over it, and other arranged to read the average value of the applied load. In either case, correct measurement is obtainable if the vehicle passes over the platform with no vertical vibration. In practice, however, the vehicle is always accompanied with vertical vibration and causes some error in the measured value. Especially, in the former class in which the maximum value is read out, the vibration of vehicle affects directly the measurement and a high accuracy can not be expected.

However, in the case wherein an average value is read out, an example of which is described in U.S. Pat. No. 3,835,945, a reasonably high accuracy is obtainable when the speed of vehicle is low and the load is applied to the platform for a long time. However, when the speed of vehicle is high and the time during which the load is applied to the platform (hereinunder referred as "weighing time") is short as compared with the period of the vertical vibration of the vehicle, it is impossible to have a correct measurement as the load may be averaged within a period which is less than one cycle of the vibration. Although elongation of the longitudinal dimension of the weighing platform has been considered in order to increase the weighing time, this dimension is limited by the minimum distance of wheel axles of the weighed vehicles, since the wheels of two or more axles cannot be placed on the same weighing platform at the sametime when the axle load or wheel load is to be measured. Thus, in the prior art devices, the speed of vehicle is limited severely in order to obtain accurate measurement.

Accordingly, an object of this invention is to provide an improved device which can measure the axle load and wheel load of a vehicle moving at a significantly high speed, at a high accuracy.

The device according to this invention, for weighing moving vehicles having the maximum number $n$ and the minimum distance $D$ of wheel axles, comprises M weighing platforms arranged serially on a road surface along the direction of motion being less than said minimum distance $D$ of wheel axles, M electromechanical converting means for producing electric signals which are respectively proportional to the loads applied respectively to said weighing platforms, N adder circuits connected respectively to the outputs of said converting means for summing up the outputs of said converting means, where N is equal to or greater than $n$, N groups of gate circuits, each group consisting of M gate circuits, inserted respectively between said converting means and adder circuits for effecting separate conduction control of the outputs of said converting means, N averaging circuits for calculating average loads from the outputs of said adder circuits respectively, and a control circuit for controlling said gate circuits such that said groups of gate circuits pass the load signals corresponding to the respective wheel axles exclusively.

Other objects and features of this invention will be described in detail hereinunder with reference to the accompanying drawings.

In the drawing.

Throughout the drawings, like reference numerals are used to donate components belonging to the same functional group.

Figure 1:
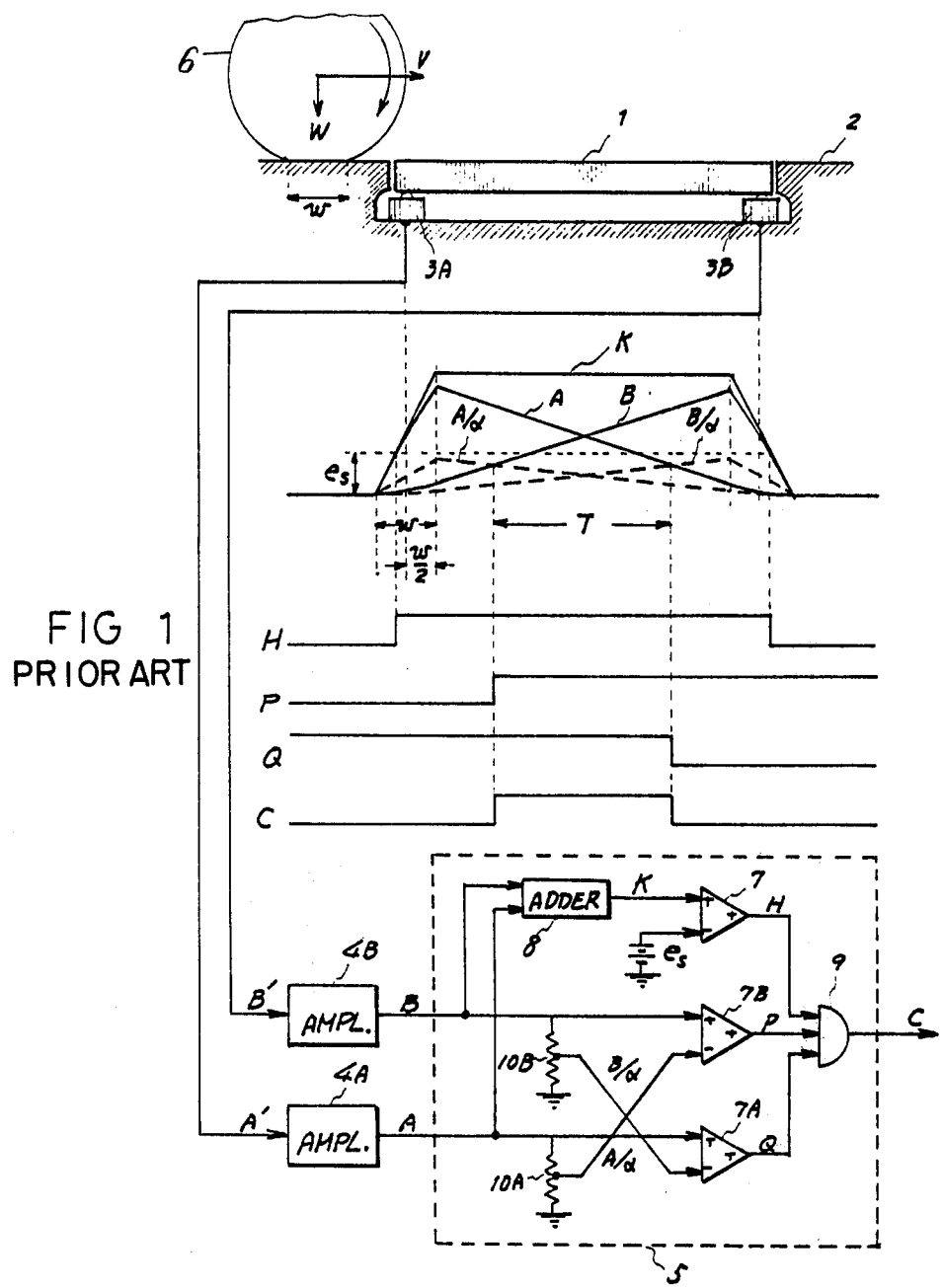
FIG. 1 is a schematic diagram of a prior art device for weighing a running vehicle.
Figure 2:
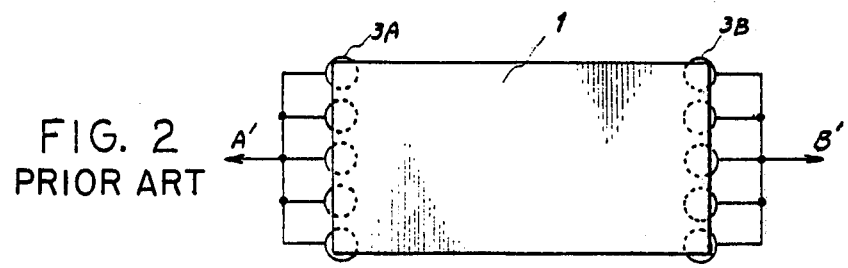
FIG. 2 is a plan view representing a weighing platform used in the device of FIG. 1.

Referring first to FIG. 1 representing a typical configuration of a prior art device, a weighing platform 1 which is a flat and rigid rectangular plate is positioned in a depression formed in a road surface 2 and supported at the both ends by a pair of piezoelectric converting elements 3A and 3B. In practice, the elements 3A and 3B respectively consist of a plurality of similar elements arranged laterally as shown in FIG. 2 and the outputs of the respective elements are coupled to produce a pair of output signals A' and B'. The signals A' and B' are respectively applied to amplifiers 4A and 4B and amplified outputs A and B are applied to a comparator circuit 5.

When a vehicle wheel 6 carrying an axle or wheel load W rolls across the weighing platform 1 from the lefthand side to the righthand side of the drawing at a speed V with a contact width $w$, the outputs A and B vary respectively along curves A and B and their sum varies along a curve K. In the prior average type device, the average axle or wheel load is obtained by integrating the voltage K for a time period $T$ except for the leading edge and the trailing edge of that voltage and then averaging it over the time $T$.

For the purpose of producing a waveform C defining the time period T, the comparator circuit 5 includes threshold detector circuits 7, 7A and 7B, an adder circuit 8 and an AND circuit 9. The output A of the amplifier 4A is connected to the main input of the threshold detector 7A and one input of the adder 9 and the output B of the amplifier 4B is connected to the main input of the threshold detector 7B and the other input of the adder 9. The outputs A and B are also grounded through voltage dividing resistors 10A and 10B, respectively, and respective intermediate points of the resistors 10A and 10B are respectively connected to the reference inputs of the threshold detectors 7B and 7A. The intermediate points of the resistors 10A and 10B are selected to divide the voltages A and B by a same divisor $\alpha$. The reference input of the threshold detector 7 is grounded through a voltage source $e_s$ so as to apply a bias voltage $e_s$ to the reference input. The outputs of the threshold detectors 7, 7A and 7B are coupled to the inputs of the AND circuit 10.

The outputs A and B of the amplifiers 4A and 4B are summed in the adder circuit 9 and the output voltage K of the adder circuit is applied to the threshold detector 7. As the threshold detector produces a constant output when the main input is higher than the reference input, the threshold detector 7 produces a waveform H when the reference voltage $e_s$ is selected adequately small as shown in FIG. 1, thereby the leading end zone and the trailing end zone of the voltage waveform K are removed. As the divided voltage A/α and B/α are respectively applied to the reference inputs of the threshold detectors 7B and 7A, it is understood from the drawing that waveforms P and Q are produced from the threshold detectors 7B and 7A, respectively. Thus, the waveform C is produced from the AND circuit 9 as a logic product of the inputs H, P and Q. The purpose of adopting the threshold detector 7 is to avoid influence of uncertain voltages in the leading and trailing end zones.

Although, in FIG. 1, the voltage K appears as constant throughout the time interval T, it varies periodically in reality due to vibration of the vehicle. More particularly, if the angular frequency and phase of the vibration are ω and φ, respectively, the load applied to the platform 1 is $$W + kW^{sin}(\omega t + \phi)$$

and the voltage K proportionate to this load is given as $$K = e<W + kW\sin(\omega t + \phi)>$$

where e is a constant. Integrating K for the time T, then, $$\int^T K dt = eWt + \int^T ekW\sin(\omega t + \phi)dt$$

Therefore, the variation of the integrated output is invalued in the second term of the righthand side of the above equation and the integrated output becomes constant, eWT, when this term becomes equal to zero, that is, when $T = 2n(\pi/\omega)$ where n is an integer including zero. This means that the influence of vibration can be cancelled if the integration time T is selected as equal to an integral multiple of the vibration frequency $2(\pi/\omega)$. However, it is not only very difficult to measure the vibration of a moving vehicle and simultaneously adjusting the time T, and also theoretically impossible to obtain the above cancellation when the period of vibration becomes less than the longest possible time T due to increase of vehicle speed. For example, when the effective length of weighing platform, which corresponds to the time T, is 1.9 meters and a large truck having a vibration of about 3Hz frequency passes at a speed above 20 kilometers per hour, the above-mentioned impossible condition takes place.

Figure 3:
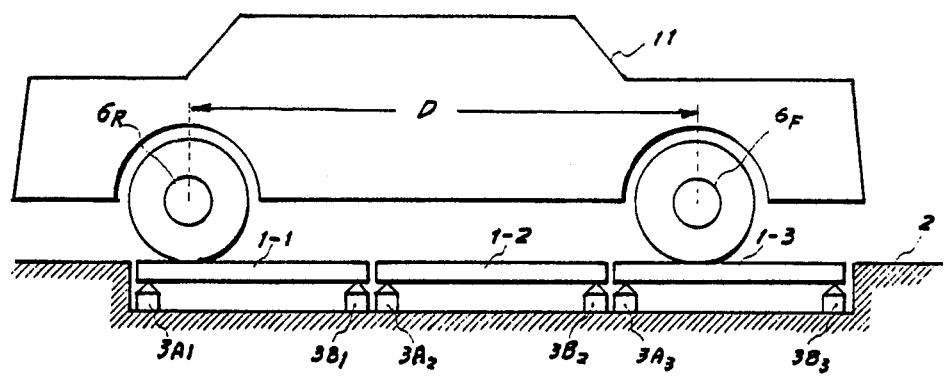
FIG. 3 is a schematic diagram illustrating certain principles of the device according to this invention.
Figure 3:
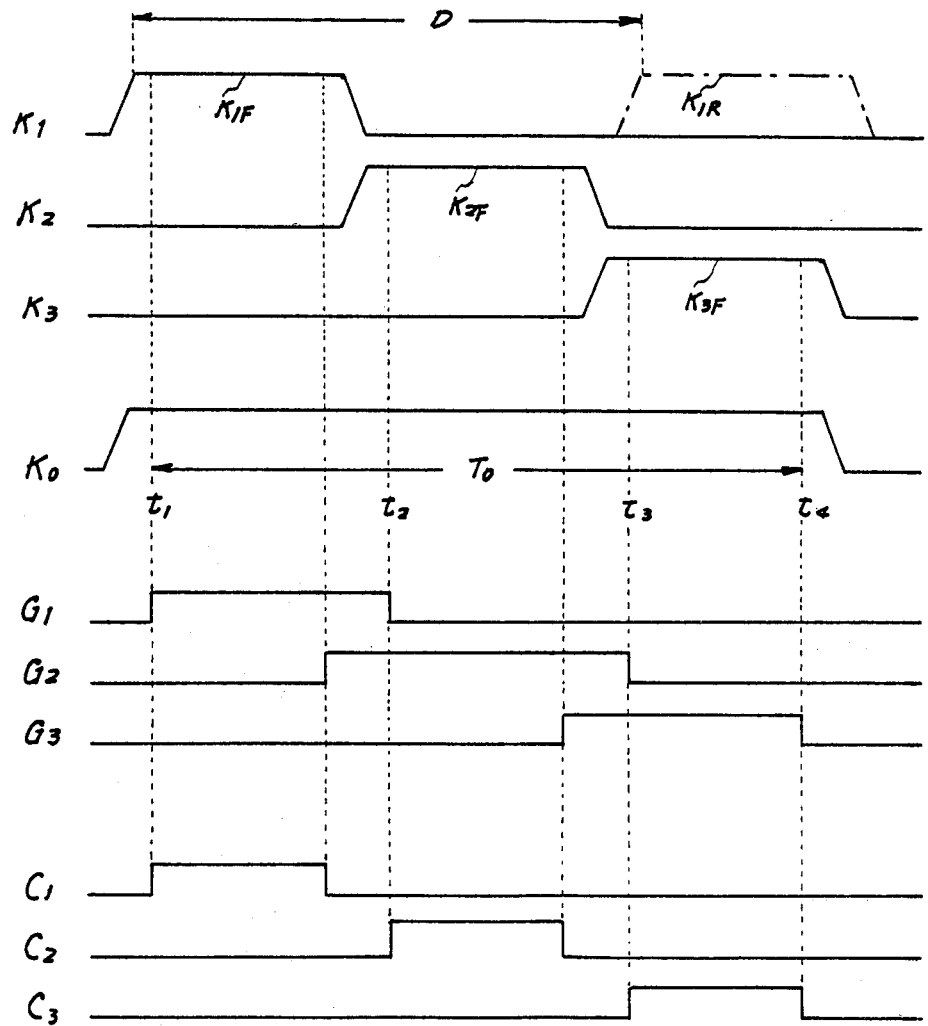

Another measure of solving this problem is to extend the T sufficiently, because the maximum of the vibration term of the above equation is $$\pm \int_0^{\frac{\pi}{\omega}} ekW\sin(\omega t + \phi)dt$$

and never increases further. However, as mentioned in the preface, extension of the interval T is limited by the length of the weighing platform 1 which is limited by the minimum distance D (FIG. 3) of wheel axles of the vehicle. According to this invention, therefore, a plurality of weighing platforms, for example, three platforms 1-1, 1-2 and 1-3 are arranged serially in the road surface 2 and supported by piezoelectric converting elements $3A_1$, $3B_1$, $3A_2$, $3B_2$, $3A_3$ and $3B_3$, respectively, as shown in FIG. 3. Now, the principle of this invention will be described with reference to this drawing.

When a vehicle 11 having a front axle 6F and a rear axle 6R passes across this weighing device from the platform 1-1 to the platform 1-3, voltage waveforms $K_1$, $K_2$ and $K_3$, which correspond to the voltage waveform K in FIG. 1 and including voltage peaks $K_{1F}$, $K_{2F}$ and $K_{3F}$ respectively, are sequentially produced from the weighing circuits belonging to the platforms 1-1, 1-2 and 1-3, respectively, by the load applied to the front axle 6F. If the voltages $K_{1F}$, $K_{2F}$ and $K_{3F}$ are summed to produce a waveform $K_O$ and the voltage $K_O$ is integrated from $t_1$ to $t_4$ and averaged by this interval $T_O$, a more correct axle load should be obtainable as compared with the prior art method using a single weighing platform.

In practice, however, as shown by a broken line curve $K_{1R}$ on the waveform $K_1$, another voltage peak is produced after each of the peaks $K_{1F}$, $K_{2F}$ and $K_{3F}$ at a delay corresponding to the distance D of the front and rear axles 6F and tR by the axle load applied to the rear axle 6R. Accordingly, in order to obtain the waveform $K_O$, the influence of these voltage peaks relating to the rear axle load must be removed in the case of a summing operation. This can be effected by previously passing the waveforms $K_1$, $K_2$ and $K_3$ through three gates, which are respectively controlled by gating pulses $G_1$, $G_2$ and $G_3$, respectively. The gating pulses $G_1$, $G_2$ and $G_3$ can be produced in accordance with this invention as described hereinunder from voltage waveforms $C_1$, $C_2$ and $C_3$ which can be produced individually in the same fashion as described in conjunction with the waveform C of FIG. 1.

Figure 4:
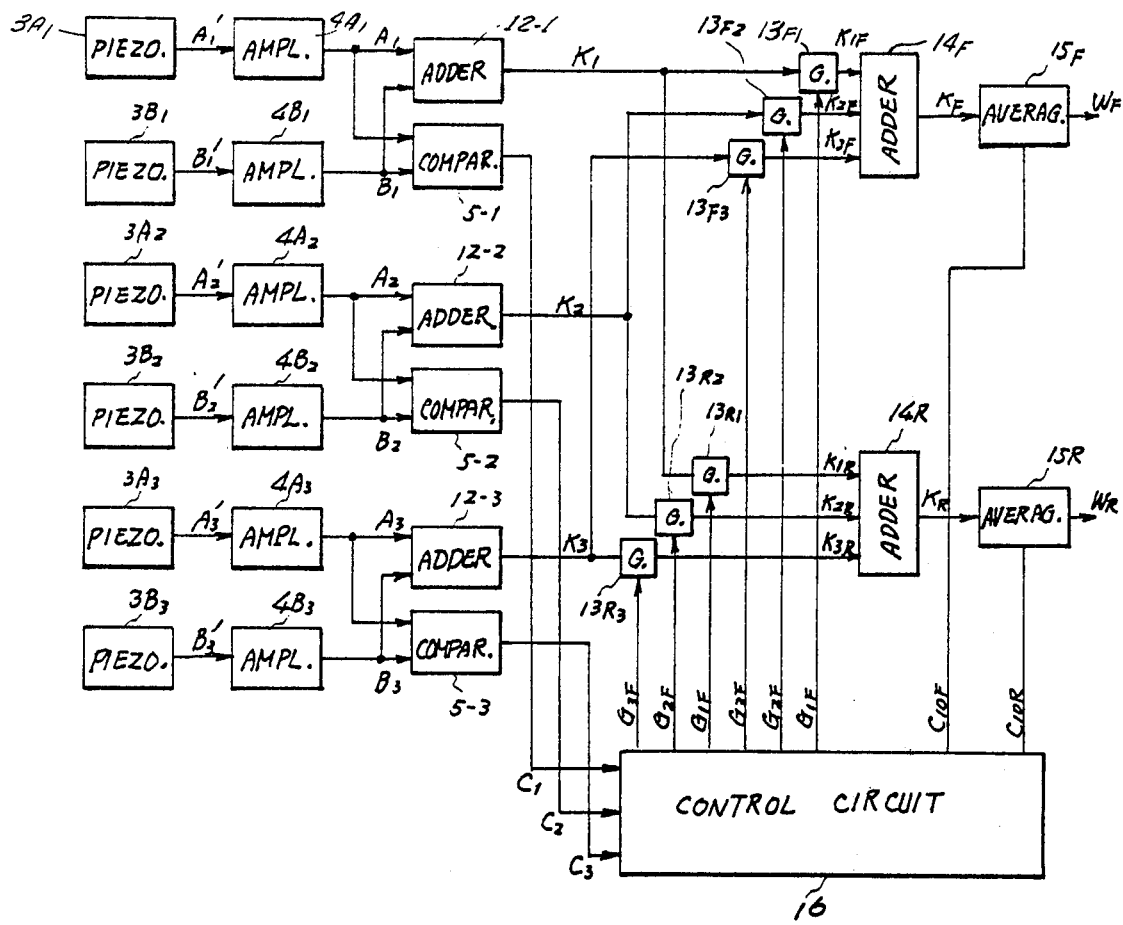
FIG. 4 is a block diagram of one embodiment of a circuit for the device according to this invention.

Referring next to FIG. 4, shown is a block circuit of the device of this invention including three pairs of piezoelectric elements $3A_1$ and $3B_1$, $3A_2$ and $3B_2$ and $3A_3$ and $3B_3$ and amplifier circuits $4A_1$ and $4B_1$, $4A_2$ and $4B_2$ and $4A_3$ and $4B_3$ to which the outputs $A_1$, $B_1$, $A_2$, $B_2$, $A_3$ and $B_3$ of the piezoelectric elements are coupled. These elements and amplifiers correspond to the elements 3A and 3B and the amplifiers 4A and 4B of FIG. 1 and serve the same functions as the latter. The outputs $A_1$ and $B_1$ of the amplifiers $4A_1$ and $4B_1$ are supplied to an adder circuit 12-1 to produce the sum output $K_1$ and also supplied to a comparator circuit 5-1 having the same configuration and serving the same function as the comparator circuit 5 of FIG. 1 to produce the output $C_1$ in the same fashion as the waveform K and C of FIG. 1 produced in accordance with the prior art. Similarly, the waveforms $K_2$, $K_3$, $C_2$ and $C_3$ of FIG. 3 are produced from the adder circuits 12-2 and 12-3 and the comparator circuits 5-2 and 5-3, respectively.

Figure 5:
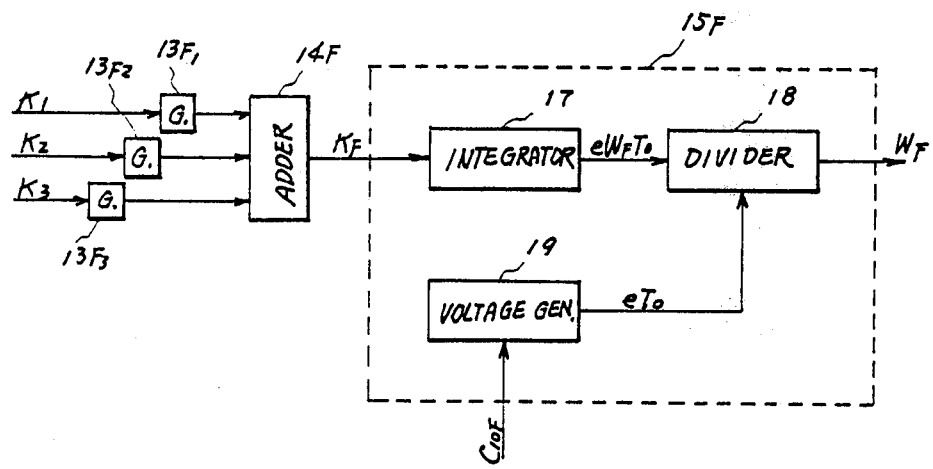
FIG. 5 is a block diagram illustrating on embodiment of the averaging circuit of FIG. 4.

The outputs $K_1$, $K_2$ and $K_3$ of the adder circuits 12-1, 12-2 and 12-3 are respectively applied through gate circuits $13F_1$, $13F_2$ and $13F_3$ to an adder circuit 14F and also applied through gate circuits $13R_1$, $13R_2$ and $13R_3$ to another adder circuit 14R. The sum outputs of the adder circuits 14F and 14R are respectively coupled to averaging circuits 15F and 15R each consisting of an integrator 17, a divider 18 and a voltage generator 19 as shown in FIG. 5. On the other hand, the outputs $C_1$, $C_2$ and $C_3$ of the comparator circuits 5-1, 5-2 and 5-3 are coupled to a control circuit 16, the configuration of which will be described hereinunder, in order to produce gate control signals such as $G_1$, $G_2$ and $G_3$ of FIG. 3.

Figure 6:
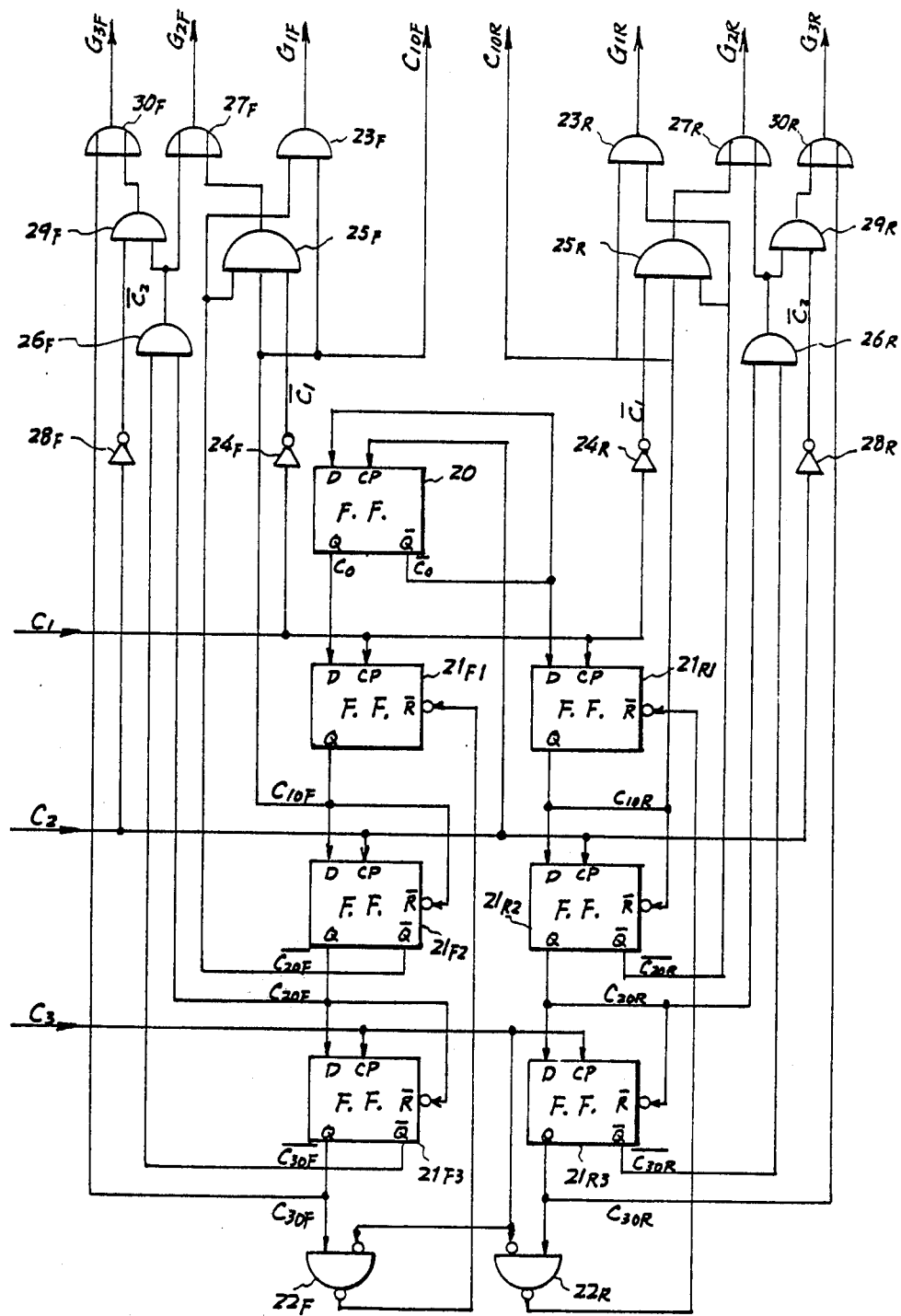
FIG. 6 is a schematic circuit illustrating one embodiment of the control circuit of the device of FIG. 4.

As shown in FIG. 6, the control circuit 16 includes seven flip-flop circuits and a pair of groups of logic gates. The flip-flop 20 is a so-called D flip-flop and operates such that the input to the D-terminal is read out from the Q-terminal in response to a clock pulse applied to the CP-terminal, while the other flip-flops $21F_1$, $21F_2$, $21F_3$, $21R_1$, $21R_2$ and $21R_3$ are D flip-flops with self-holding means and operate such that the input to the D-terminal is read out from the Q-terminal in response to the first clock pulse applied to the CP-terminal and the output is maintained as it is until a reset pulse is applied to the $\overline{R}$-terminal. In the drawing, the first group of components in the lefthand half having reference numerals appended with a symbol F, except for the flip-flop 20, relate to the front axle load $W_F$, while the second group of components having reference numerals appended with a symbol R relate to the rear axle load $W_R$. As the both groups of components are similarly connected and serve similar function, the description will be made in conjunction with the first group only.

The outputs $C_1$, $C_2$ and $C_3$ are coupled to the CP-terminals of the flip-flop $21F_1$, $21F_2$ and $21F_3$, respectively, and the output $C_2$ is also coupled to the CP-terminal of the flip-flop 20. The input terminal D of the flip-flop 20 is coupled from the output terminal $\overline{Q}$ of itself and the output terminals Q of the flip-flops 20, $21F_1$ and $21F_2$ are respectively coupled to the input terminals D of the next state flip-flops $21F_1$, $21F_2$ and $21F_3$. The Q-output of the flip-flop $21F_3$ is coupled to an input of a NAND gate 22F with the other input inhibited. The output $C_3$ is also coupled to the inhibited input of the NAND gate 22F and the output of the NAND gate 22F is coupled to the reset terminal $\overline{R}$ of the flip-flop $21F_1$. The outputs of the flip-flops $21F_1$ and $21F_2$ are also coupled to the reset terminals $\overline{R}$ of the next stage flip-flops $21F_2$ and $21F_3$ respectively.

The output of the flip-flop $21F_1$ and the $\overline{Q}$-output of the flip-flop $21F_2$ are connected through an AND gate 23F to the gate circuit $13F_1$ (FIG. 4). The output $C_1$ is also connected through a NOT circuit 24F to an AND gate 25F together with the Q-output of the flip-flop $21F_1$ and the $\overline{Q}$-output of the flip-flop $21F_2$ and the Q-output of the flip-flop $21F_2$ and the $\overline{Q}$-output of the flip-flop $21F_3$ are connected to an AND gate 26F. The outputs of the AND gates 25F and 26F are connected through an OR gate 27F to the gate circuit $13F_2$ (FIG. 4). The output $C_2$ is further connected through a NOT circuit 28F to an AND gate 29F together with the output of the AND gate 26F and the output of the AND gate 29F and the Q-output of the flip-flop $21F_3$ are connected through an OR gate 30F to the gate circuit $13F_3$ (FIG. 4).

The components of the second group are connected similarly to the first group, except that the $\overline{Q}$-output of the flip-flop 20 is coupled to the D-input of the flip-flop $21R_1$. Thus, the outputs of the AND gate 23R and the OR gates 27R and 30R are connected to the gate circuits $13R_1$, $13R_2$ and $13R_3$, respectively, as shown in FIG. 4. The outputs of the $\overline{Q}$-terminals of the flip-flops $21F_1$ and $21R_1$ are also connected to the voltage generators 19 of the averaging circuit 15F and 15R (FIG. 4), respectively.

Now, the operation of the circuits of FIGS. 4 and 6 will be described in detail with reference to the waveform diagram of FIG. 7. It should be understood from the foregoing description with reference to FIG. 3 that the outputs $K_1$, $K_2$ and $K_3$ of the adder circuits 12-1, 12-2 and 12-3 and the outputs $C_1$, $C_2$ and $C_3$ of the comparator circuits 5-1, 5-2 and 5-3 have waveforms as shown by the same symbols in FIG. 7, when the vehicle 11 moves across the platforms 1-1, 1-2 and 1-3, successively, as shown in FIG. 3.

The Q-output of the flip-flop 20 is previously set at HIGH level and, therefore, the $\overline{Q}$-output and, accordingly, the D-input thereof are at LOW level. As the flip-flop 20 is triggered by the leading edge of the pulse $C_2$ applied to the CP-terminal and the D-input is read out from the Q-terminal every application of the $C_2$ pulse, the output waveform at the Q-terminal of the flip-flop 20 becomes as shown by $C_O$ in FIG. 7.

The output $C_O$ of the flip-flop 20 is applied to the D-terminal of the flip-flop $21F_1$ and read out from the Q-terminal thereof by the pulse $C_1$ applied to the CP-terminal at time $t_1$. Accordingly, the Q-output of the flip-flop $21F_1$ is switched to HIGH level at time $t_1$ and maintained as it is until the flip-flop $21F_1$ is reset. In a similar fashion, the $\overline{Q}$-outputs of the flip-flops $21F_2$ and $21F_3$ are successively switched by the pulses $C_2$ and $C_3$ to HIGH level at times $t_2$ and $t_3$, respectively, as shown. At the trailing edge of the pulse $C_3$, both inputs of the NAND gate 22F become HIGH and, therefore, its output becomes LOW. As this LOW output is applied to the inhibited reset terminal $\overline{R}$ of the flip-flop $21F_1$ to reset it, its Q-output is switched to LOW and the output waveform becomes as shown by $C_{10F}$ in the drawing. As the flip-flops $21F_2$ and $21F_3$ are reset successively by the LOW level outputs of the preceding reset flip-flops $21F_1$ and $21F_2$ respectively, their Q-outputs are also switched to LOW level substantially at the same time $t_4$ as the trailing edge of the pulse $C_3$ and the output waveforms become as shown by $C_{20F}$ and $C_{30F}$, respectively, in FIG. 7.

The output of the AND gate 23F is a logic product of the waveforms $C_{10F}$ and $C_{20F}$ and, therefore, its waveform becomes as shown by $G_{1F}$ and maintains the HIGH level between the times $t_1$ and $t_2$. From similar analysis of the operation of the other logic gates, it should be easily understood by those skilled in the art that the output waveforms of the OR gates 27F and 30F are as shown by $G_{2F}$ and $G_{3F}$. Similarly, voltage waveforms $C_{10R}$, $C_{20R}$ and $C_{30R}$ are derived from the Q-outputs of the flip-flops $21R_1$, $21R_2$ and $21R_3$, respectively, and waveforms $G_{1R}$, $G_{2R}$ and $G_{3R}$ are derived from the logic gates 23R, 27R and 30R, respectively. As mentioned above, the gate control waveforms $G_{1F}$, $G_{2F}$, $G_{3F}$, $G_{1R}$, $G_{2R}$ and $G_{3R}$ are applied to the control terminals of the gate circuits $13F_1$, $13F_2$, $13F_3$, $13R_1$, $13R_2$ and $13R_3$, respectively, and the waveforms $C_{10F}$ and $C_{10R}$ are applied to the voltage generators 19 (FIG. 5) of the averaging circuits 15F and 15R, respectively, as shown in FIG. 4.

Figure 7:
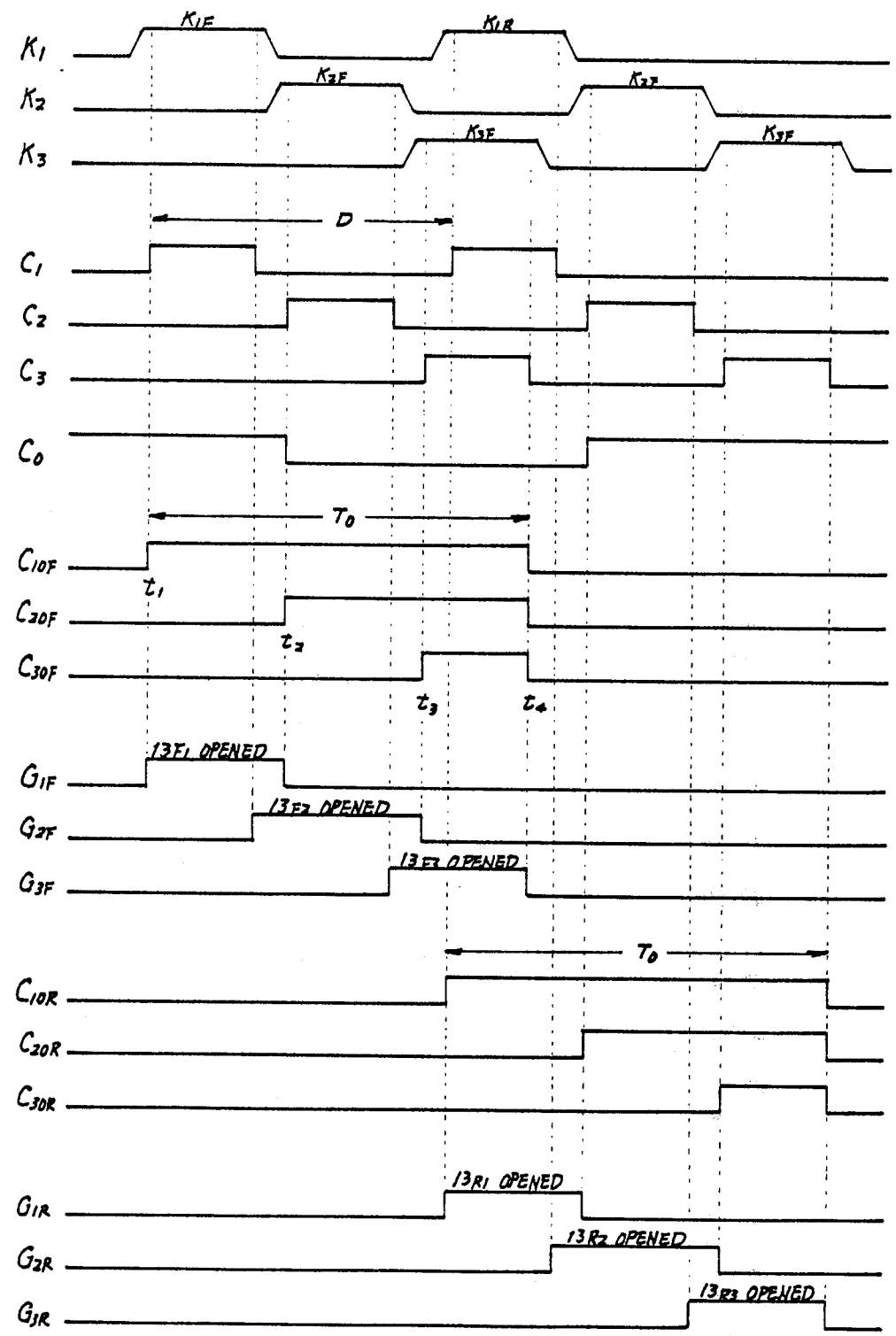
FIG. 7 is a waveform diagram to facilitate explanation of the device of FIG. 5.

As the gate circuits $13F_1$, $13F_2$ and $13F_3$ are controlled by the waveforms $G_{1F}$, $G_{2F}$ and $G_{3F}$ as shown in FIG. 7, only the voltage peaks $K_{1F}$, $K_{2F}$ and $K_{3F}$ caused by the load on the front axle 6F of the vehicle 11 (FIG. 3) are sampled from the voltage waveforms $K_1$, $K_2$ and $K_3$, respectively, and supplied to the adder circuit 14F. Thus, a voltage $K_F$ corresponding to the load on the front axle is produced from the adder circuit 14F for a time period $T_O$ from $T_1$ to $t_4$. Similarly, the voltage peaks $K_{1R}$, $K_{2R}$ and $K_{3R}$ caused by the load on the rear axle are sampled by the gate circuits 13R₁, 13R₂ and 13R₃, respectively, and the adder circuit 14R outputs a voltage $K_R$ corresponding to the load on the rear axle for the time $T_O$.

The output $K_F$ of the adder circuit 14F is integrated for the time $T_O$ by the integrator 17 in the averaging circuit 15F (FIG. 5) and the integrated output is given as follows as previously mentioned.

$$\int^{T_0} K_F dt = eW_F T_0 + \int^{T_0} ekW_F \sin(\omega t + \phi)dt$$

As, in the device of this invention, the time $T_O$ is selected long enough, the second term of the righthand side of the equation is neglegible with respect to the first term and the integrated output is approximately equal to $eW_F T_O$. On the other hand, the signal $C_{10F}$ indicating the time $T_O$ is applied from the control circuit (FIG. 4) to the voltage generator 19 in the averaging circuit 15F and a voltage corresponding to $eT_O$ is produced therein. As the divider 18 serves the function of dividing the output voltage $eW_F T_O$ of the integrator 17 by the output $eT_O$ of the voltage generator 19, the output of the divider 18, that is, the output of the averaging circuit 15F gives the axle load $W_F$ on the front axle. By the same operation, the averaging circuit 15R produces an output expressing the axle load $W_R$ on the rear axle.

As described above, the accuracy of measurement can be improved by increasing the length of time $T_O$ by increasing the number of weighing platforms according to this invention, though the length of each platform is limited to the minimum distance between the wheel axles. Although the above enbodiment is described in case of three platforms, it should be easily understood that, when the number of platforms is increased above three, the flip-flop stages (21) in the control circuit 16 and the gate circuits (13) must be increased in correspondence with increase of the outputs (K and C) of the load detecting circuits. Corresponding modification of the logic gate configuration in the control circuit 16 for providing the gate control pulses (G) for the increased gate circuits should be also easily deduced by those skilled in the art.

On the other hand, although the above embodiment is described in case of two wheel axles, this invention can be also applied to three or more wheel axles. When the number of wheel axles is increased above two, the bistable flip-flop 20 must be substituted with tristable or other multistable flip-flop and the rows of flip-flops (21) and the groups of logic gates in the control circuit 16 must be correspondingly increased. And, the number of sets of gate circuits (13), adder circuit (14) and averaging circuit (15) must be increased. Such a modification should be also easily deduced by those skilled in the art.

What is claimed is:

1. A device for weighing moving vehicles having the maximum number $n$ and the minimum distance D of wheel axles, comprising M weighing platforms arranged serially on a road surface along the running direction of said vehicles, the dimension of said weighing platforms being less than said minimum distance D of wheel axles, M electromechanical converting means for producing electric signals which are respectively proportional to the loads applied respectively onto said weighing platforms, N adder circuits connected respectively to the outputs of said converting means for summing up the outputs of said converting means, where N is equal to or greater than $n$, N groups of gate circuits, each group consisting of M gate circuits inserted respectively between said converting means and adder circuits for effecting separate conduction control of the outputs of said converting means, N averaging circuits for calculating average loads from the outputs of said adder circuits respectively, and a control circuit for controlling said gate circuits such that said groups of gate circuits pass exclusively the load signals corresponding to the respective wheel axles.

2. The device according to claim 1, wherein said electromechanical converting means include means for producing M pulse trains, each pulse train including N timing pulses expressing a predetermined effective weighing time of each of said M weighing platforms relating to said N wheel axles, and said control circuit includes a switching circuit having N output terminals and being driven by at least one of said M pulse trains for producing an output at a time sequentially from said output terminals, self-holding D flip-flop circuits arranged in an array of M rows and N columns, the inputs of said N columns being connected respectively to the output terminals of said switching circuit and said rows being controlled by said M pulse trains, and N groups of logic circuits for combining the outputs of said flip-flop circuits at every column to produce N groups of control signals, each group consisting of M signals, and supplying said control signals respectively to said N groups of gate circuits, each consisting of M gate circuits.

3. The device according to claim 1, wherein said control circuit includes a circuit for producing N signals respectively corresponding to total weighing times, each continuing from the beginning to the end of M timing pulses belonging to each wheel axle in said M pulse trains, and said averaging circuits include respectively an integration circuit for integrating each output of said adder circuits and a divider circuit for dividing the output of said integration circuit by said signal corresponding to the total weighing time.

* * * * *